United States Patent [19]

McNaney

[11] 4,158,486
[45] Jun. 19, 1979

[54] LIGHT BEAM MESSAGE CHARACTER GENERATING SYSTEM

[76] Inventor: Joseph T. McNaney, 8548 Boulder Dr., La Mesa, Calif. 92041

[21] Appl. No.: 841,839

[22] Filed: Oct. 13, 1977

[51] Int. Cl.² .................................................. G02F 1/11
[52] U.S. Cl. ............................................................. 350/358
[58] Field of Search ................... 350/358; 331/94.5 M; 332/7.51

[56] References Cited
U.S. PATENT DOCUMENTS

| | | | |
|---|---|---|---|
| 3,988,055 | 10/1976 | McNaney | 350/358 |
| 4,004,847 | 1/1977 | McNaney | 350/358 |

Primary Examiner—William L. Sikes

[57] ABSTRACT

The system herein includes light optic means for generating and displaying a plurality of individual message characters simultaneously with the establishing of said characters at predetermined positions across the surface of a record medium as opposed to the more well known acousto-optic or movable mirror light beam scanning devices or systems.

4 Claims, 7 Drawing Figures

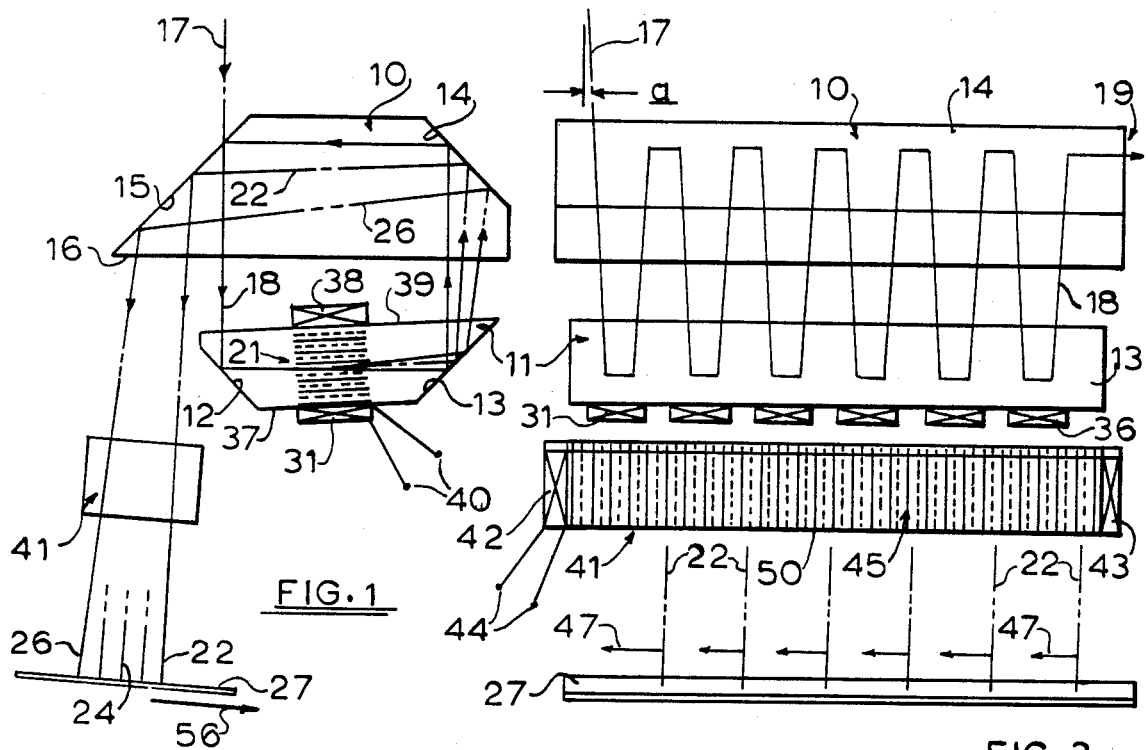
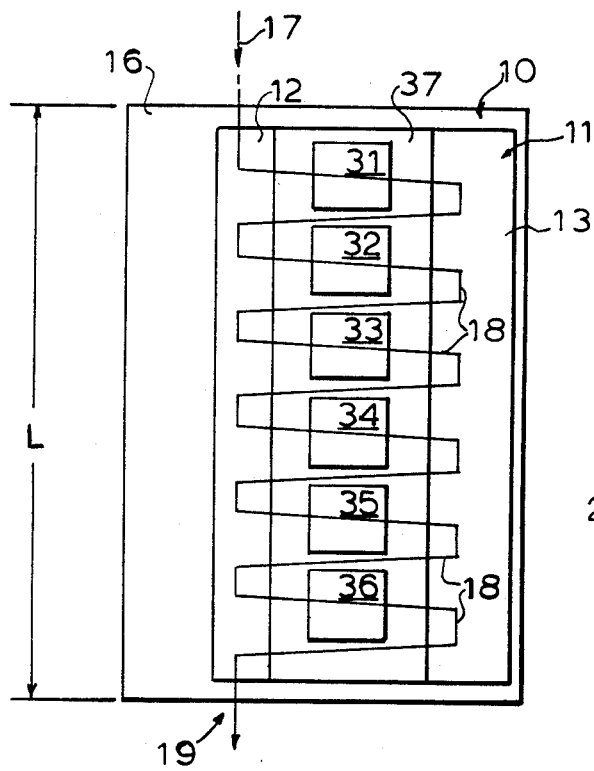
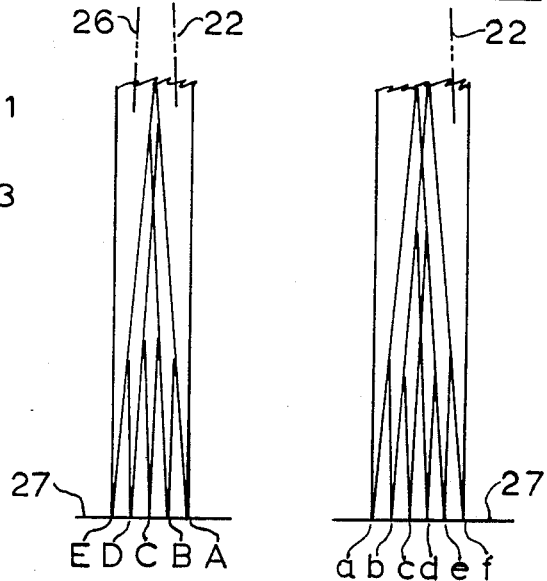
FIG. 1
FIG. 2
FIG. 3
FIG. 4
FIG. 5

LIGHT BEAM MESSAGE CHARACTER GENERATING SYSTEM

BACKGROUND OF THE INVENTION

The invention herein relates to certain teachings disclosed in the applicant's U.S. Pat. No. 3,988,055 issued Oct. 26, 1976, and also to certain teachings to be found in applicant's U.S. Pat. applications Ser. No. 729,310 filed 10/04/76. The present invention includes the use of a plurality of individually controlled OFF or ON conditioned light beam deflection control means positioned intermediate two succeeding surfaces of an array of light reflecting surfaces as shown in the U.S. Pat. No. 3,988,055 and included in the present invention are means set forth in the applications herein noted for manifesting a magnification of a predetermined light redirecting sensitivity of the individually controlled light beam deflection control means.

SUMMARY OF THE INVENTION

A beam of light, preferably from a laser source of light, which can be in the form of radiant energy extending from ultraviolet, through the visible spectrum, to infrared, is directed along an input path toward a light admitting surface of the character generating system of the invention. Upon entering the system, light is then directed along a plurality of paths therein which will be referred to as primary optical paths within the system. In following their primary paths, which will be in a selective manner, a light beam undergoes a series of light reflections which cause the beam to spiral its way through a length dimension of the system so as to make available light thereof at any of a number of output control positions extended along the length dimension of the system. By means of controllable OFF or ON conditioned light reflection control means at each output control position light will be redirected, selectively, along any one of a plurality of secondary optical paths and toward an output surface of the system, each plurality of secondary paths stemming from a corresponding one of the control positions. Light along each such plurality of secondary paths will provide, for example, a vertical array of light beams which will be deflected in a line across a display medium and utilized in the generation of a line of message characters. Intermediate the output surface and the display medium a secondary light beam reflection control means is included to effect a horizontal scan of the vertical array of beams which stem from each of the plurality of OFF or ON conditioned control means. The total line scan requirements of the secondary reflection control means, therefore, will be divided by the number of OFF or ON conditioned control means in the system. Accordingly, an object of the invention is to increase the light spot resolution capability of a given secondary reflection control means by a factor that will be equal to the number of individual OFF or ON conditioned control means included in the invention. And, accordingly, a further object is to minimize the length of the light path, and space requirements, between the secondary reflection control means and the display medium. It is, however, an object of this invention to provide operating efficiencies, resolution and light beam deflection capabilities which extend beyond those found in present day light beam deflectors or message character generators.

The invention is illustrated, by way of example only, in the accompanying drawings and the description which follows, when read in connection with the drawings, will provide a better understanding of the objectives and still other advantages of the invention as will be seen by those skilled in the arts.

BRIEF DESCRIPTION OF THE DRAWINGS

FIGS. 1, 2 and 3 show first, second and third views, diagrammatically illustrated, of a preferred embodiment of the light beam message character generating means of the invention;

FIG. 4 will be referred to in describing the cylindrical lensing effects of the OFF or ON conditioned light reflection control means;

FIG. 5 will be referred to in describing the cylindrical lensing effects of the secondary reflection control means;

DESCRIPTION OF THE INVENTION

Figure 6:
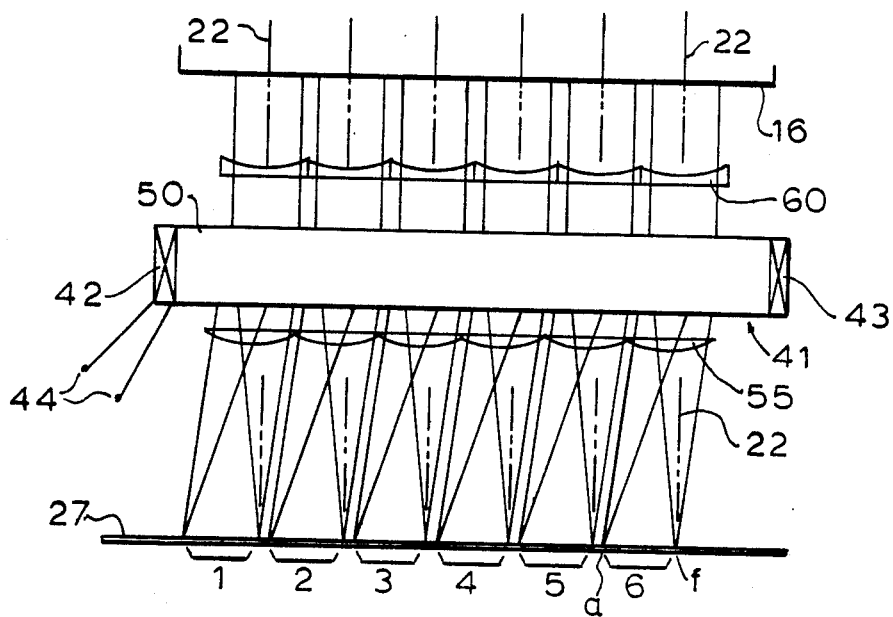
FIG. 6 represents but a portion of the system embodiment which will be helpful in the description of the secondary reflection control means.

Referring now to FIGS. 1, 2 and 3, this preferred embodiment of the invention has been drawn utilizing dimensions, proportions and configurations which are to be understood as being exemplifications and drawn in the manner most helpful toward understanding the invention. The system includes first and second light conducting members 10 and 11, each having a length dimension L as shown in FIG. 2. The member 10 can be understood as being of a material such as plastic, glass or a like material, and the member 11 can also be of a material such as glass, but in some cases it may be, preferably, of a material such as quartz, lithium niobate, or still other forms of light conducting material. The member 11 can be understood as having two light reflecting surfaces 12 and 13, and the member 10 is also exemplified as having two light reflecting surfaces 14 and 15, and an output surface 16. One or more of these reflecting surfaces can, of course, be coated with silver and function as mirrors. Light, preferably from a laser source, is directed along an input path 17 toward the surface 12, and at a predetermined angle a as indicated in FIG. 3. Upon entering the member 10 through surface 15 the light will be directed along, what will be referred to as, a primary optical path 18 by means of the reflecting surfaces 12, 13 and 14, and then repeatedly by surfaces 15, 12, 13 and 14, so as to spiral its way through the length L of the system, forming a helix of plural revolutions which extends to the opposite end 19.

In this preferred embodiment the member 11, additionally, will be allowed to function as an acousto-optic light deflector including, for example, a system of six independently controllable transducer means 31 through 36, each intimately joined to a surface 37 of the member 11, in combination with an ultrasonic frequency absorber means 38 intimately joined to the surface 39 of the member 11. Each of the transducer means can include a slab of piezoelectric material having electrodes on opposing surfaces thereof and conductor means 40 for the extending of an ultrasonic frequency voltage thereto. Upon the application of a predetermined frequency voltage to a given one of the transducers the acoustic wave generated thereby, and subsequent perturbing of the index of refraction of the member material 11, establishes a thick diffraction grating 21 in a corresponding portion of the interaction medium 11. As exemplified in FIG. 1, the path of the acousto-optic effect 21 in relation to the primary optical light path 18 between the reflecting surfaces 12 and 13 establishes a redirecting of light along a first secondary optical path 22. However, a change in the frequency of the voltage being applied to this one transducer will effect a redirecting of the light along another secondary optical path 26. It may be assumed that further changes in the ultrasonic frequency voltages being applied to the transducer will provide corresponding changes in the secondary path and under each set of circumstances light will be redirected toward the surface 14, then reflected therefrom toward surface 15, then reflected therefrom through the output surface 16 toward and incident upon the surface of a message character display medium 27.

Since this embodiment of the invention exemplifies the use of six individually controlled transducer means 31 through 36, upon the application of predetermined frequency voltages, selectively, to these transducer means light may be directed accordingly along secondary paths 22 through 26 extending from any one of these six independently controllable OFF or ON conditioned light reflection control means. The direction and optical path length of each of number of secondary paths 22 to 26, between the point each are directed away from the primary optical path 18 and the output surface 16 results in a magnification of the light redirecting sensitivity of the light reflection control means within the system of reflecting surfaces. The degree of magnification manifests itself at each of these surfaces, beginning at surface 13, then at surface 14, then at the surface 15 before reaching the output surface 16, through which each of the light paths extend in the direction of the display medium 27. Intermediate the output surface 16 and the medium 27 this embodiment of the invention includes a secondary OFF or ON conditioned light reflection control means 41 which includes a light conducting medium through which the light will pass before reaching the medium 27.

The signal voltages hereinbefore referred to as being applied to transducer means 31 to 36, in each instance, will include a range of ultrasonic frequencies and a corresponding perturbing of indices of refraction of the interaction medium of member 11 which is presented across the light beam along the primary optical path 18. Because of the spread of the ultrasonic frequencies, each portion of the light beam will be diffracted at a different angle in relation to an otherwise normal light path resulting in a cylindrical lensing effect which produces a focusing of a given beam of light at the surface of the medium 27, as indicated in FIG. 4, and identified as focal points A, B, C, D & E. The opposite cross sectional dimension of a light beam remains unaffected by this cylindrical lensing effect as produced by a selected one of the light reflection control means.

As exemplified in FIG. 3, each series of secondary light paths 22 through 26 stemming, respectively, from the individual reflection control means 31 through 36 coincide with a predetermined position at and across the surface of the display medium 27. Since each of the series of light paths extend into the surface of the drawing, only the initial path 22 of each series is shown in the drawing. The secondary OFF or ON conditioned light reflection control means 41 is again shown in FIG. 3, and it is designed to function as an acousto-optic light deflector having a transducer means 42 intimately joined to an end surface thereof in combination with an ultrasonic frequency absorber means 43 intimately joined to an opposite end surface thereof. Transducer means 42 can include a slab of piezo-electric material having electrodes on opposing surfaces thereof and terminal means 44 for extending the influence of an ultrasonic frequency voltage thereto. Upon the application of a predetermined frequency voltage to these terminals 44 an acoustic wave generated by the transducer, and subsequent perturbing of the index of refraction of the control means 41, establishes a thick diffraction grating in the interaction medium thereof. As exemplified in FIG. 3, an acousto-optic effect 45 will be established in the path of light along any one of the secondary paths 22 through 26, stemming from any one of the reflection control means 31 through 36, and the angle of light incident thereon will allow a redirecting of light to take place in the direction of arrow 47. Depending upon the frequency of the applied voltage the light will be established along any one of a number of predetermined paths to the left of, what can be considered as, reference paths 22.

Figure 7:
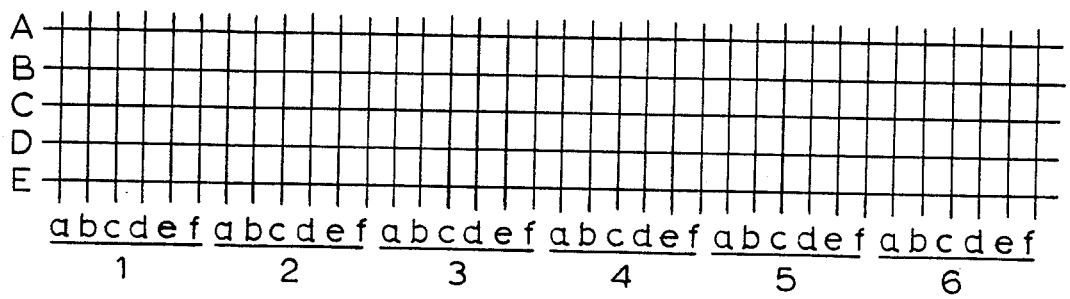
FIG. 7 includes a diagram to be referred to in describing the character generating aspects of the invention.

The signal voltages hereinbefore referred to as being applied to the transducer means 42 will include a range of ultrasonic frequencies and a corresponding perturbing of the index of refraction of the interaction medium 50 which is presented across a given beam of light directed toward the display medium 27. Because of the spread of the ultrasonic frequencies, each portion of the light beam will be diffracted at a different angle in relation to an otherwise normal light path resulting in a cylindrical lensing effect which produces a focusing of a given beam of light at the surface of the display medium 27, as indicated in FIG. 5, and identified therein as potential focal points a, b, c, d, e & f. A system of additional cylindrical lenses 55 can be positioned intermidiate the reflection control system 41 and the medium 27 for supplementing the focusing and deflection capabilities of the control system 41. The additional lens system is shown in FIG. 6, wherein, each of the areas to the left of each reference path 22 are identified as areas 1, 2, 3, 4, 5 & 6. Each of these areas are designed to accommodate a series of light beams as they are individually directed toward the focal points a, b, c, d, e & f within a given area. The diagram of FIG. 7 identifies the total of 180 different positions at which a light beam may be focused at the surface of medium 27, including the five vertical positions A through E and the horizontal positions a to f in each of the areas 1 through 6. The invention is not limited in this regard since a greater number of vertical beam positions can be provided in combination with a much greater number of horizontal beam positions. The number of horizontal positions can be increased through the use of more than the six reflection control means 31 to 36 referred to in the drawings, and providing for a greater number than the six beam positions a to f stemming from a given control means through the secondary deflection system 41.

The display medium 27 can be understood as being of a light sensitive material and movable in the direction of arrow 56. When an application requirement calls for generating message character information utilizing both vertical and horizontal positioning of a light beam across the medium as suggested in FIG. 7, the medium 27 will be advanced in a step-by-step manner from one exposed line of characters to a next line position. However, the invention is not to be limited in this regard since the generating of lines of message characters can be accomplished as well by advancing the medium 27 at a constant rate while being exposed to a programmed series of horizontally positioned light beams across the medium 27. Upon the completion of a given number of these horizontally positioned spots of light the end result will be the equivalent of generating message character information utilizing both vertical and horizontal positioning of the light beam. When limiting the use of the invention to a series of horizontally positioned light beams in combination with a constant movement of the medium 27 the operational requirements of each of the reflection control means 31 through 36 will be limited to a redirecting of light along a secondary optical path 22, through the secondary control means 41, toward medium 27. Since the input beam diameter requirements of light along the primary optical path 18, and under the control of each of the position control means 31 through 36, will be different than the cross sectional requirements of each of the light beams entering the secondary control means 41, additional passive optical elements 60 will be included along each of the secondary paths 22 intermediate the output surface 16 and the reflection control means 41. Light entering the control means 41 selectively along a corresponding one of the paths 22 may, therefore, occupy and overlap adjacent portions of the interaction medium 50 through which succeeding light beams will pass, since this medium 50 will be common to all light entering it, but in different time periods.

It should be understood by those skilled in the arts pertaining to the construction and application possibilities of the invention herein set forth that the embodiments included herein illustrate in a very limited sense the usefulness of the invention and that the invention includes other modifications and equivalents as they be seen by those skilled in the arts but still being within the scope of the appended claims.

I claim:

1. In a light deflecting device of the type having a transparent parallelapiped member with a plurality of light reflecting surfaces directing a light beam along a helical path of plural revolutions through the transparent member, said revolutions being side-by-side along a length dimension of said member, at least first and second transducer means intimately joined to a surface of said member and positioned thereon, side-by-side, in the direction of said length and coinciding, respectively, with first and second revolutions of the helical path along which said light beam is directed, the improvement comprising:

means for connecting ultrasonic frequency voltages, selectively, to said first and second transducer means for establishing correspondingly first and second series of individual light diffraction gratings in said transparent member and effecting, thereby, a redirecting of said light beam away from said helical path and along first and second series of individual secondary paths stemming, respectively, from said first and second series of individual light diffraction gratings, said light along each said secondary path undergoing a succession of light reflections within said plurality of light reflecting surfaces extending to, and thereupon beyond, the light reflecting limits of said plurality of light reflecting surfaces.

2. The invention as set forth in claim 1 including, light beam display means presenting a display surface having a width dimension; and means for directing light, extending beyond said reflecting limits of the plurality of light reflecting surfaces, toward said display surface for establishing thereon first and second series of incident light stemming, respectively, from said first and second series of secondary paths, said incident light representative of first and second series of light beam reference positions at said display surface and positioned thereon in a spaced apart side-by-side relationship in the direction of said width dimension of the display surface.

3. The invention as set forth in claim 2 including, secondary light deflector means with transducer means, and having a light transparent interaction medium positioned in the paths of the light stemming, respectively, from said first and second series of secondary paths and being directed toward said display surface;

means for connecting ultrasonic frequency voltages, selectively, to said transducer means for establishing, accordingly, light diffraction gratings in said interaction medium for controlling said directing of light toward said display surface and a directing of said light to positions thereon adjacent, respectively, said first and second series of light beam reference positions.

4. In a light deflecting device of the type having a light input surface, a light output surface, and an array of light reflecting surfaces intermediate said input surface and said output surface, a source of light and means for directing light therefrom along an input path toward said input surface and thereupon along an optical path while undergoing a series of light reflections within said array of light reflecting surfaces so as to establish an availability of light from said source coincident with at least first and second locations along said optical path for an optically controlled redirecting of said light, selectively, at either one of said locations and a reflecting of said light along a corresponding one of first or second secondary paths within said array of reflecting surfaces toward said light output surface and thereupon beyond the light reflecting limits of said array of surfaces, each of said locations being representative of a light output control position of said device, said array of reflecting surfaces each angularly oriented so as to allow said light to follow said optical path forming a helix of plural revolutions, said first and second locations coinciding, respectively, with first and second ones of said revolutions, light redirecting means operatively associated with each of said control positions for establishing, selectively, a light diffraction grating in the path of said light thereat for effecting said controlled redirecting of the light at said location, wherein the improvement comprises:

said light redirecting means including first and second acousto-optic light deflectors each having a light conducting interaction medium positioned along said optical path for said light coinciding, respectively, with said first and second locations, first and second transducer means intimately joined, respectively, to the interaction medium of said first and second light deflectors and means for connecting an ultrasonic frequency voltage, selectively, to said first or second transducer means for said establishing of a light diffraction grating in the path of said light;

said optically controlled redirecting of the light at either of the locations including a redirecting of said light along a selected one of first or second secondary paths stemming from said first location and corresponding to voltages connected to said first transducer means, or, a redirecting of said light along a selected one of first or second secondary paths stemming from said second location and corresponding to voltages connected to said second transducer means, said light along each said secondary path undergoing a succession of light reflections within said array of light reflecting surfaces extending to, and thereupon beyond, the light reflecting limits of said array of light reflecting surfaces.

* * * * *